United States Patent

Ostermeier et al.

[11] Patent Number: 6,113,320
[45] Date of Patent: Sep. 5, 2000

[54] DRILLING TOOL

[75] Inventors: Peter Ostermeier, Diessen; Rudolf Reitberger, Munich, both of Germany

[73] Assignee: Hilti Aktiengesellschaft, Schaan, Liechtenstein

[21] Appl. No.: 09/265,470

[22] Filed: Mar. 10, 1999

[30] Foreign Application Priority Data

Mar. 13, 1998 [DE] Germany .......................... 198 10 910

[51] Int. Cl.⁷ .......................... B23B 45/00; B23B 51/06
[52] U.S. Cl. ............................... 408/56; 408/57
[58] Field of Search ................... 408/56, 57, 60, 408/61

[56] References Cited

U.S. PATENT DOCUMENTS

| | | | |
|---|---|---|---|
| 3,414,875 | 12/1968 | Larson | 408/61 |
| 3,583,383 | 6/1971 | Ovshinsky | 408/56 |
| 3,767,313 | 10/1973 | Bohoroquez et al. | 408/57 |
| 5,951,216 | 9/1999 | Antoun | 408/56 |

FOREIGN PATENT DOCUMENTS 294106   12/1991   Japan ....................................... 408/57

*Primary Examiner*—Daniel W. Howell
*Attorney, Agent, or Firm*—Brown & Wood, LLP

[57] ABSTRACT

A drilling tool including a chuck (10) for receiving a drill (2), a cooling medium delivery conduit (3) for delivering a cooling medium to the drill (2), and a first valve (5) for controlling flow of the cooling medium through the delivery conduit (3) and having an inlet (50) and an outlet (51) a cross-section of which can be reduced to zero.

9 Claims, 2 Drawing Sheets

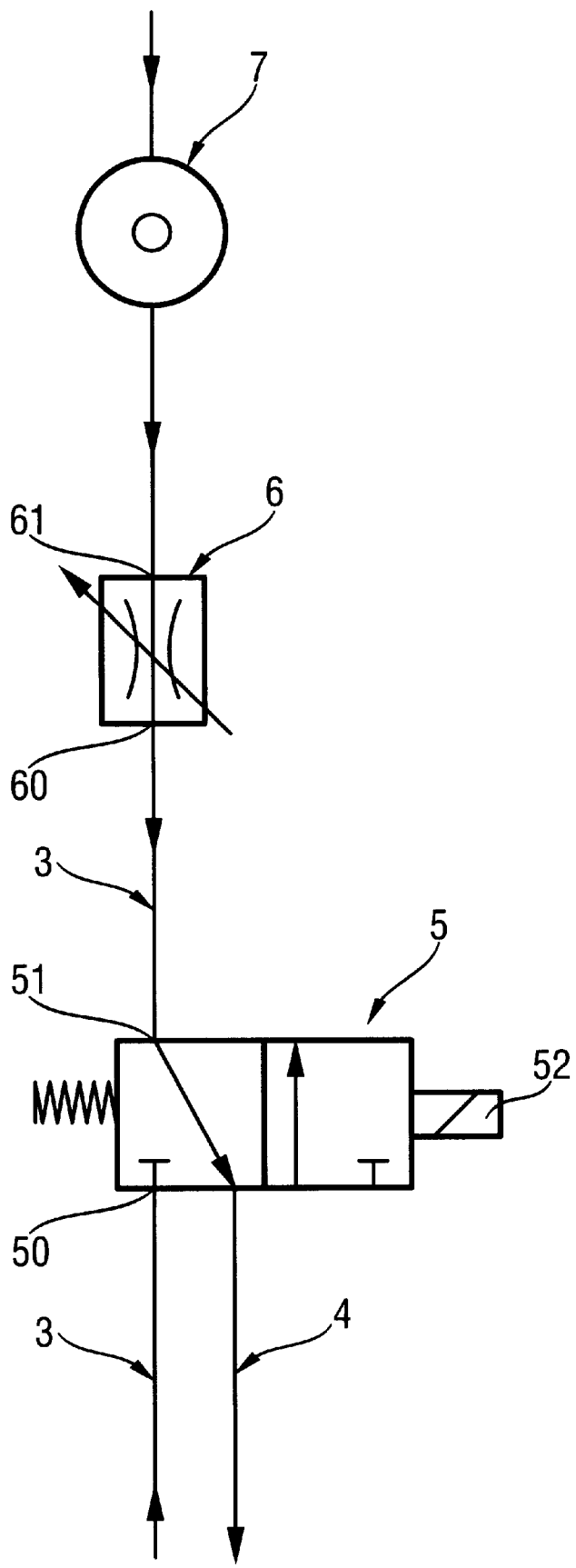

DRILLING TOOL

BACKGROUND OF THE INVENTION

1. Field of the Invention

The present invention relates to a drilling tool including a chuck for receiving a drill, and a cooling medium delivery conduit for delivering a cooling medium to the drill.

2. Description of the Prior Art

During the formation of bores in hard constructional components formed of concrete, stone, steel and the like, it is necessary to deliver to a working position a large amount of cooling medium for cooling the drill and for removing drillings. German Utility Model DE-GM 8 200 668 discloses, e.g., a drilling tool which cooperates with a cooling medium delivery conduit for delivering a cooling medium. The delivery conduit opens into the interior of the drilling tool housing in the chuck region, wherefrom the cooling medium reaches the interior of the support member of a drill. The delivery conduit is connected with a pump which is arranged in a reservoir with the cooling medium. For the delivery of an amount of the cooling medium corresponding to the pump output, the pump should be each time switched on before each drilling operation and switched off after each drilling operation.

An object of the present invention is a drilling tool with a simple and reliable delivery of a cooling medium and with the amount of the cooling medium, which is delivered to a working position, being adjustable on demand.

SUMMARY OF THE INVENTION

This and other objects of the present invention, which will become apparent hereinafter, are achieved by providing a first valve for controlling the fluid medium flow through the delivery conduit and having inlet and outlet channels, with the cross-section of the outlet channel being reducible to zero. The first valve permits to rapidly and reliably interrupt the flow of the cooling medium which, e.g., is delivered under pressure from an external reservoir.

Preferably, the delivery conduit cooperates with a second valve which is seriesly connected with the first valve and has an outlet channel the cross-section of which can be partially reduced. The second valve permits to change the amount of the fluid medium delivered to the drill.

In order to keep the second valve pressure-free when the drilling tool is not operated, advantageously, the first valve is located, in the flow direction of the cooling medium, upstream of the second valve.

To facilitate handling, advantageously, the reduction of the cross-section of the outlet channels of the first and second valves is effected with respective control members.

To provide for displacement of the control member of the second valve independently from the operation of the tool, preferably, a manually operated set screw is used for displacement of the control member of the second valve.

An easy and simple actuation of the first valve is achieved when the control member of the first valve is actuated, advantageously, by an electric solenoid.

In order to provide for the flow of the cooling medium to the working position simultaneously with the actuation of the drilling tool, advantageously the control of the solenoid is effected with the actuation trigger of the drilling tool.

To provide for the flow of the cooling medium, which accumulates in the drill, back to the cooling medium reservoir after the completion of the drilling process, there are provided a cooling medium discharge conduit and an interrupt member, which cooperates with the drilling tool, with the interrupt member providing for connection of a portion of the delivery conduit, which is located between the first valve and the drill, with the discharge conduit in a non-operational position of the actuation trigger of the drilling tool.

Delivery of the cooling medium is controlled advantageously with a sight glass, with which the delivery conduit is, advantageously connected. The sight glass is located downstream, in the flow direction of the cooling medium, of the second valve.

To facilitate the mounting of both valves and of the sight glass in the drilling tool, both valve and the sight glass are supported on a mounting plate, with a portion of the delivery conduit also being arranged in the mounting plate. The delivery conduit can cooperate, e.g., with a pressure compensating device with which the pressure of the cooling medium can be maintained constant and ready for use. The pressure compensating device equalizes the pressure in the cooling medium delivery conduit when this pressure varies.

BRIEF DESCRIPTION OF THE DRAWINGS

The features and objects of the present invention will become more apparent, and the invention itself will be the best understood from the following detailed description for the preferred embodiment when read with reference to the accompanying drawing, wherein:

FIG. 2 shows a connection diagram of cooling medium delivery and discharge conduits.

DETAILED DESCRIPTION OF THE PREFERRED EMBODIMENT

Figure 1:
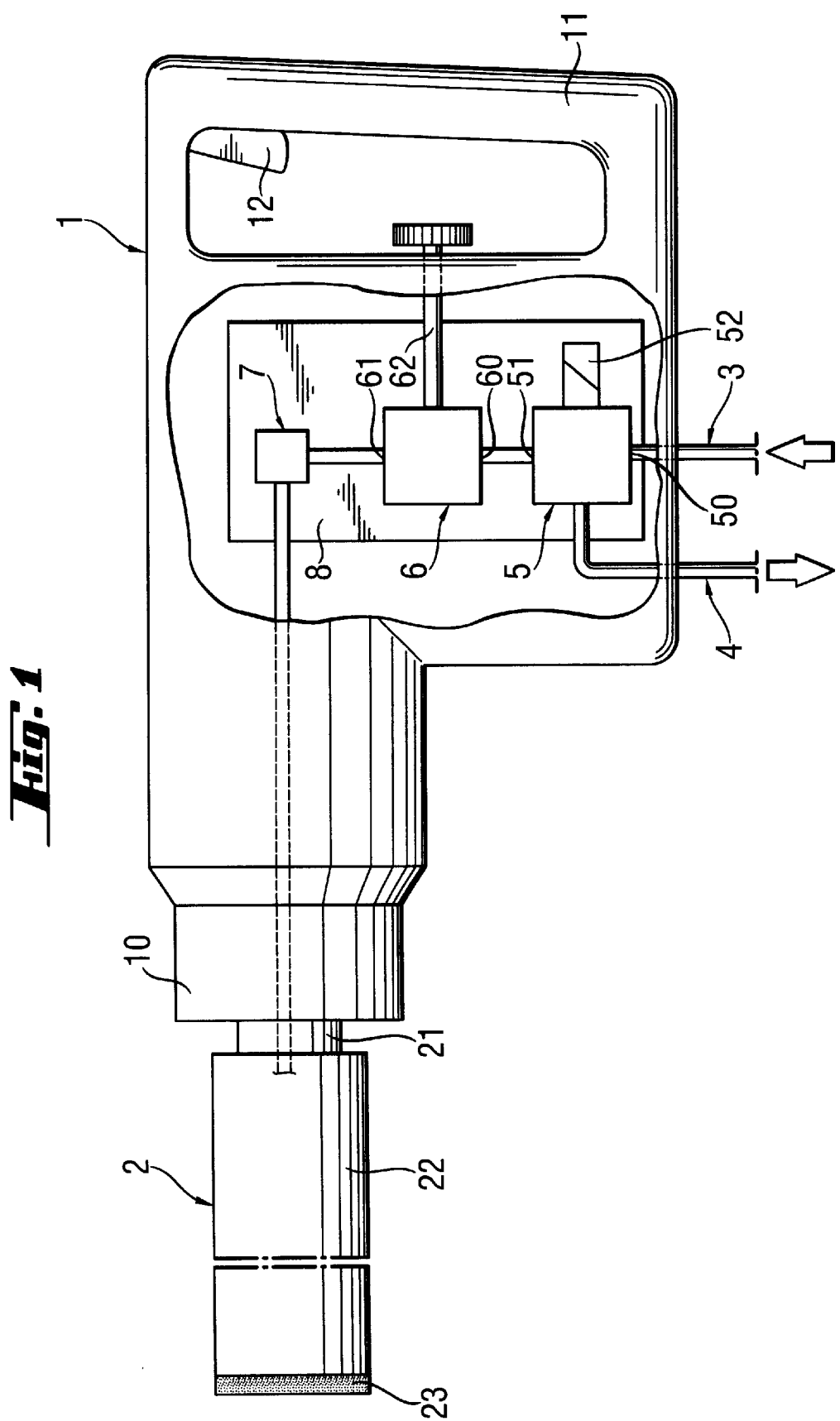
FIG. 1 shows schematic view of a drilling tool with an inserted drill.

A drilling tool, which is shown in FIG. 1, includes a housing 1, a handle 11, an actuation trigger 12, a rotatably supported chuck 10, a drill 2 clamped in the chuck 10, a cooling medium delivery conduit 3, and a cooling medium discharge conduit 4. The delivery conduit 3 cooperates with first and second valves 5 and 6 and a sight glass 7. The delivery conduit 3 opens into the interior of the housing 1 in the region of the sight glass 7 and from there, it extends through the central region of the chuck 10 into the interior of the drill 2. The drill 2 is formed of a shank 21, a tubular support member 22 and an annular cutting region 23.

As shown in FIGS. 1 and 2, the first and second valves 5 and 6 have, respectively, inlets 50, 60 and outlets 51, 61. The first valve 5 is located, in the flow direction, upstream of the second valve 6. The first valve 5 includes a displaceable control member which is capable of reducing the cross-section of the outlet 51 to zero. The control member of the first valve 5 is displaced by a solenoid 52. The first valve 5 is connected with the discharge conduit 4 and connects, in its actuated condition, a portion of the delivery conduit 3, which extends between the inlet 50 of the first valve 5 and the drill 2, with the discharge conduit 4.

The second valve 6 likewise has a control member with which the cross-section of the outlet channel 61 is reduced. The displacement of the control member of the second valve 6 is effected with a manually actuated set screw 62.

A portion of the delivery conduit 3 is arranged in a mounting plate 8 on which the first and second valves 5 and 6 are supported.

Though the present invention was shown and described with references to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A drilling tool, comprising a chuck (10) for receiving a drill (2); a cooling medium delivery conduit (3) for delivering a cooling medium to the drill (2); a first valve (5) for controlling flow of the cooling medium through the delivery conduit (3) and having an inlet (50) and an outlet (51) a cross-section of which can be reduced to zero; and a second valve (6) for controlling flow of the cooling medium through the delivery conduit (3) and seriesly connected with the first valve (5), the second valve (6) having an outlet channel (61) a cross-section of which can partially be reduced.

2. A drilling tool according to claim 1, further comprising a sight glass (7) located, in a flow direction of the cooling medium, downstream of the second valve (6), the delivery conduit (3) being connected with the sight glass (7).

3. A drilling tool according to claim 1, wherein the first valve (5) is located, in a flow direction, of the cooling medium, upstream of the second valve (6).

4. A drilling tool according to claim 1, wherein the first and second valves (5 and 6) each includes a displaceable control member for effecting reduction of the cross-section of the respective outlet (51 and 61).

5. A drilling tool according to claim 4, wherein the second valve (6) includes a manually actuated set screw (62) for displacing the control member thereof.

6. A drilling tool according to claim 4, wherein the first valve (5) includes an electric solenoid (52) for displacing the control member thereof.

7. A drilling tool according to claim 6, wherein control of the solenoid (52) of the first valve (5) is effected with an actuation trigger (12) of the drilling tool.

8. A drilling tool according to claim 7, further comprising a cooling medium discharge conduit (4) and an interrupt member which connects, in a non-actuated position of the actuation trigger (12), a portion of the delivery conduit (3), which is located between the first valve (5) and the drill (2), with the discharge conduit (4).

9. A drilling tool according to claim 2, further comprising a mounting plate (8) for supporting the first and second valves (5, 5) and the sight glass (7), a portion of the delivery conduit (3) being arranged in the mounting plate (8).

* * * * *